(No Model.)
W. JOHNSTON.
THILL COUPLING.
No. 267,693. Patented Nov. 21, 1882.
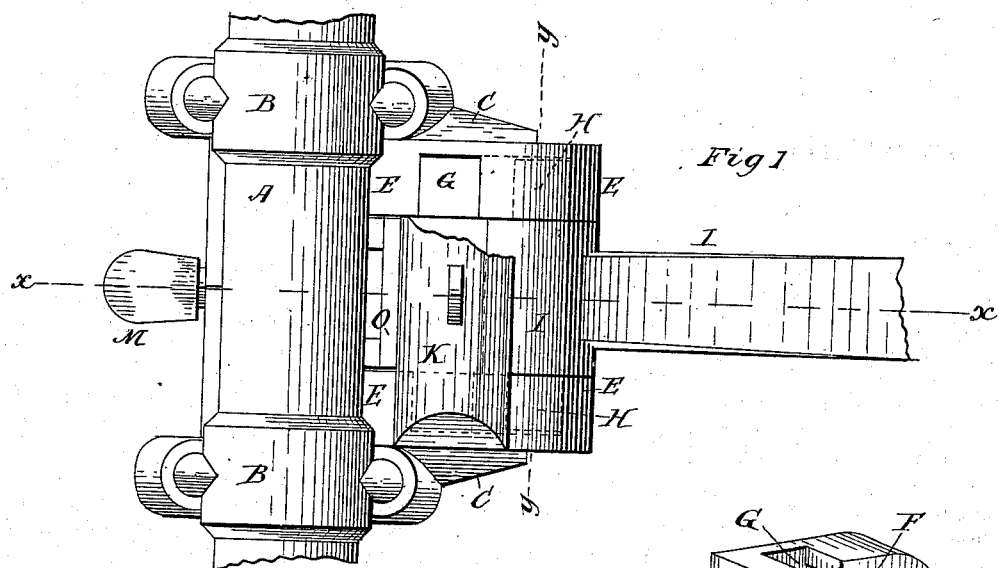
Fig 1
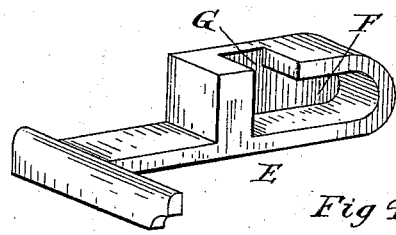
Fig 4
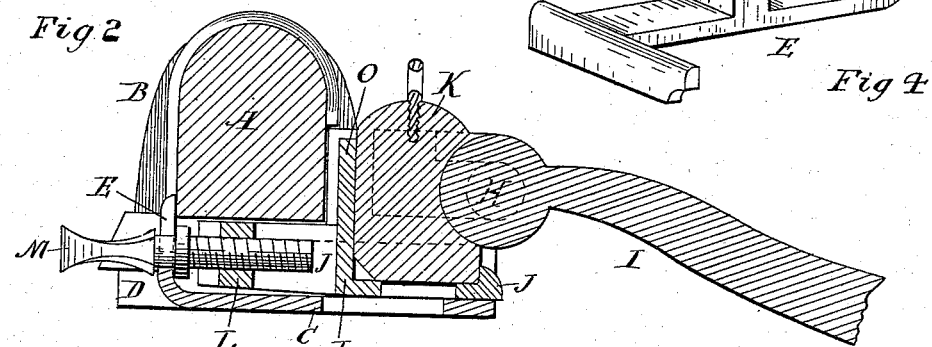
Fig 2
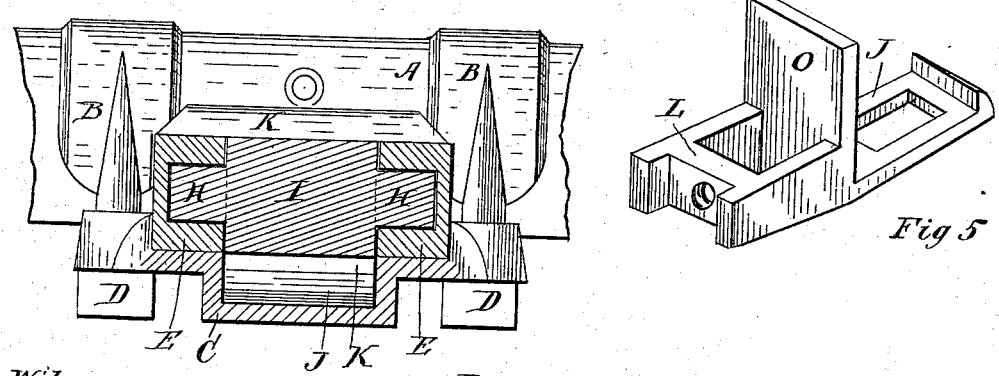
Fig 3
Fig 5
Witnesses
Inventor
William Johnston

UNITED STATES PATENT OFFICE.

WILLIAM JOHNSTON, OF MARINETTE, WISCONSIN.

THILL-COUPLING.

SPECIFICATION forming part of Letters Patent No. 267,693, dated November 21, 1882.

Application filed March 4, 1882. (No model.)

*To all whom it may concern:*

Be it known that I, WILLIAM JOHNSTON, a citizen of the United States, residing at Marinette, in the county of Marinette and State of Wisconsin, have invented a new and useful Improvement in Thill-Couplings, of which the following is a specification, reference being had to the accompanying drawings, in which—

Figure 1 represents a top or plan view of my thill-coupling with a portion of the top of the cushion cut away; Fig. 2, a transverse sectional view taken on the line $x\ x$, Fig. 1; Fig. 3, a sectional view taken at the line $y\ y$, Fig. 1; Fig. 4, a perspective view of one of the draw-irons detached, and Fig. 5 a perspective view of the slide that carries the rubber cushion detached.

The object of my invention is to make a safe and secure thill-coupling which will be noiseless, strong, and durable, and at the same time be as free from the admission of dirt or gravel to the bearings as possible.

My invention consists in the construction of the draw-irons; also, in the construction of the sliding plate which carries the rubber cushion, its combination with the base-plate and thumb-screw; and, also, in the construction of the rubber cushion, and the combination of various parts, as hereinafter specified.

In the accompanying drawings, A represents the axle.

B B are clips, by which the thill-coupler is secured to the axle.

C is the base-plate of my thill-coupler, to which the clips B are secured by means of the nuts D.

E E are two draw-bars, which pass between the base-plate C and the axle A, and are held securely in place by shoulders and projections, which strike against the axle when the base-plate is secured to the axle by means of the clips B. These draw-bars have recesses F, with an opening, G, at their tops, as clearly shown in Fig. 4. These recesses receive the trunnions H of the thill-iron I.

J is a sliding block, which carries the rubber cushion K. It rests on the base-plate C between the draw-irons E. The base-plate C is constructed in such shape that this slide or sliding block can pass back under the axle between the clips, as shown in Figs. 2 and 3.

L is a cross-bar adapted to receive the thumb-screw M, which turns in a journal-bearing formed in the rear edge of the base-plate and the back projections (shown in Fig. 4) of the draw-irons, and slides the sliding block J back and forth on the base-plate C, as hereinafter described.

K is a rubber cushion, which fits between the draw-irons E and rests upon the sliding bar J, so as to be moved with it to press against the thill-iron. The slide J has an upwardly-projecting flange, O, which rests against the back side of the rubber cushion and forces it against the thill-iron when the slide is moved forward by means of the thumb-screw M. The front side of the rubber cushion is concave to fit the thill-iron, and its top is provided with a projecting flange or cap, which covers the recesses G and excludes the water and dirt therefrom.

To apply my thill-coupler to the axle I place the draw-irons E upon the base-plate C, and then secure the base-plate to the axle by means of the clips B, thus securing the draw-irons E securely in place. The thumb-wheel M is placed in position between the draw-irons and the base-plate, as clearly shown in Fig. 2, before the base-plate is secured to the axle. The slide J is then inserted in place on the base-plate between the draw-irons, so that the cross-bar L will receive the thumb-screw. The thill-iron is then coupled by passing its trunnion or draw-pin through the slots G into the recesses F of the draw-irons. The thumb-screw enables me to move the slide J and press the rubber cushion firmly against the thill-iron, and compensate for any wear, and always hold the parts firmly and securely in position.

When it is desired to uncouple the thills or pole from the vehicle the thumb-screw M is turned so as to draw back the slide J, when, by tipping the rubber cushion K slightly forward, it can be readily removed. Then by moving the trunnions back in the recess F they can be lifted through the slots G.

By making the draw-irons E in separate pieces I am able to renew them when worn or broken cheaply, and by having a slide which carries my rubber cushion moved by a thumb-screw I am able at all times to make a tight and secure coupling and give any desired pressure to the rubber cushion against the thill-iron.

By having a projecting cap or flanges on the top of the rubber cushion I am able to cover the slots in the draw-irons and keep the dirt and rain from the recesses in which the thill-trunnions or draw-irons have their bearings.

Having thus fully described the construction and operation of my thill-coupling, what I claim as new, and desire to secure by Letters Patent, is—

In a thill-coupling, the slide J, arranged between the base-plate and the axle, and provided with the upwardly-projecting flange O, in combination with means for fastening it at different adjustments in a direction at right angles to the axle, with draw-irons having each a recess closed in front, and with a thill-iron having trunnions arranged to enter the recesses, substantially as and for the purpose described.

WILLIAM JOHNSTON.

Witnesses:
 AMOS HOLGATE,
 H. J. PLOCE.